United States Patent [19]

Jansen et al.

[11] 4,236,225
[45] Nov. 25, 1980

[54] DATA BUFFER MEMORY OF THE FIRST-IN, FIRST-OUT TYPE, HAVING A VARIABLE INPUT AND A FIXED OUTPUT

[75] Inventors: Pierre G. Jansen; Jozef L. W. Kessels; Benny L. A. Waumans, all of Eindhoven, Netherlands

[73] Assignee: U.S. Philips Corporation, New York, N.Y.

[21] Appl. No.: 965,208

[22] Filed: Nov. 30, 1978

[30] Foreign Application Priority Data

Dec. 12, 1977 [NL] Netherlands ............... 7713707

[51] Int. Cl.³ .................................. G06F 13/00
[52] U.S. Cl. .................................... 364/900
[58] Field of Search ... 364/200 MS File, 900 MS File; 365/239, 230, 220

[56] References Cited

U.S. PATENT DOCUMENTS

| 3,646,526 | 2/1972 | Fagan et al. | 365/230 |
| 3,745,535 | 7/1973 | DeKoe et al. | 364/900 |
| 3,771,142 | 11/1973 | Minshull et al. | 364/200 |
| 3,942,163 | 3/1976 | Goyal | 364/900 |
| 4,062,059 | 12/1927 | Suzuki et al. | 364/200 |
| 4,095,283 | 6/1978 | Campbell et al. | 365/230 |

Primary Examiner—Harvey E. Springborn
Attorney, Agent, or Firm—Thomas A. Briody; Robert T. Mayer; James J. Cannon, Jr.

[57] ABSTRACT

A data buffer memory for the first-in, first-out type, having an input bus by which data are supplied to the buffer, and a fixed output from which data are transferred from the buffer. Each section of the buffer includes logic whereby a variable input location can be selected. Status signals are used to determine, in cooperation with signals supplied from outside the buffer, the location where data are to be written in the buffer and when these data in the buffer must be shifted to the output.

7 Claims, 7 Drawing Figures

DATA BUFFER MEMORY OF THE FIRST-IN, FIRST-OUT TYPE, HAVING A VARIABLE INPUT AND A FIXED OUTPUT

BACKGROUND OF THE INVENTION

1. Field of the Invention

The invention relates to a data buffer memory of the "first-in, first-out" type, comprising logic for ensuring that, depending on the previously stored contents of the buffer, the input for data to be written is situated substantially as near as possible to the output for data to be read, thus providing substantially uninterrupted contents of the buffer. The invention includes an input bus by which data can be supplied to the buffer, that is, to an input of a register thereof assigned for this purpose, and an output which is connected to the last register of the buffer and on which data to be read appear.

2. Description of the Prior Art

A wide variety of data buffer memories of the first-in, first-out type are known to serve as buffer devices in digital data processing and communication systems at locations where differences occur in the rate in which input data is supplied and the rate in which output data is consumed. A number of the known buffers are distinguished by simplicity of construction, notably by a pronounced repetitive nature of the various sections of the buffer. An example is the buffer described in U.S. Pat. No. 3,745,535.

A problem encountered in buffers of this kind consists in that, if the capacity of the buffer amounts to n sections, a message which is supplied to an empty buffer appears on the output only after n clock pulse cycles. Particularly if n is large ($>32$), unacceptable delays are then liable to occur in practice. These buffers are thus characterized as having a fixed input and a fixed output.

Also known are buffers which do not involve such a delay, because counting devices are used to ensure that a variable input location as well as a variable output location of the buffer can be activated, so that the data, especially in the "empty state" of the buffer, need not be transported through the entire register each time for transfer from an input to an output. Buffer devices of this kind are known from the British Patent Specification No. 1,479,774. A major problem occurring in buffer devices of this kind, however, is that the complexity of control strongly increases, notably in the case of buffers having a large number of sections. Counters having a high counting capacity and elaborate decoding and selection networks for the inputs and outputs to be assigned are required. Moreover, linking of a large number of small buffers in order to form a larger buffer is not possible without additional complications.

As the need for circuits and systems which are suitable for construction in solid-state integrated techniques increases, the interest in constructing buffer memories so that a repetitive character is obtained strongly increases. Moreover, the chances of linking a plurality of buffers without incurring additional complications are thus generally enhanced. A buffer of this kind which, moreover, does not involve the problem of long delay times as stated above, is known from U.S. Pat. No. 3,646,526. This Patent describes a buffer memory having a variable input and a fixed output, a marker bit indicating the location to which data must be supplied from an input bus to the buffer which thus has a variable input. This location is an empty cell which is situated nearest to the output of the buffer adjoining a series of filled cells between this input location and the output of the buffer. This buffer memory, however, has a special construction in which only one marker bit, being a control bit for the data section of the buffer, enables a data path of 1 bit. Therein, the situation arises in which given sections of this buffer device serve for transporting the marker bit as well as in the data bits. The risk of the occurrence of errors in this buffer, therefore, is real: if a 1 bit is incorrectly regarded as a marker bit, control of the data flow is disturbed. The risk of instability of the buffer, therefore, is not imaginary, because permanent uncertainty may arise with respect to the correct input location from the input bus to the buffer.

SUMMARY OF THE INVENTION

The invention has for its object to provide a buffer memory of the described type, having a variable input and a fixed output, which has a simple and repetitive set-up and which, moreover, offers minimum a delay time for data transfer and also has a self-stabilizing character. In order to achieve this object, the data buffer memory is characterized in that logic is provided for each section of the buffer and, with the exception of the connections, at least functionally separate from the sections of the buffer itself, the logic being of the type enabling the following signals to be generated for the buffer comprising n registers $(0, \ldots n-1)$:

(a)

$$app(i) = creq \bigcap_{j=O}^{i} s\overline{(j)} \cdot s(i+1),$$

which indicates, in reaction to a request "creq" from outside the buffer, the register (i) of the buffer in which data are received from the input bus, $$\bigcap_{j=O}^{i} s\overline{(j)} \cdot s(i+1)$$

determining where, from a series of empty registers $(0, \ldots i)$, the empty register (i) adjoins a subsequent filled register $(i+1)$;

(b) $sh(i) = s(i-1) \cdot s\overline{(i)}$ which, if this condition is satisfied, is the shift signal for shifting the data inside the buffer in the direction of the output, $s(i-1) = 1$ indicating the status "full" of a preceding register and $s\overline{(i)} = 1$ indicating the status "empty" of the relevant register (i);

(c) $s(i):=1$, which represents the status signal for the filling of a register (1) as a result of a signal app(i) of sh(i), the signal becoming $s(i):=0$ for $0 \leq i < n-1$, if the contents of the register (i) are advanced in the case of the signal $sh(i+1)$, the status signal becoming $s(n-1):=0$ for the register $(n-1)$ if an acknowledge signal (ers) is given for this purpose from outside the buffer after the reading of the register $(n-1)$.

It is an essential aspect that there is no mix-up of the control section formed by the logic and the data transport section. The width of the data path of the data section can be arbitrarily chosen. No restriction exists as regards the width of the data path. As a result of the fact that the register (i) in which data are loaded from the input bus is unambiguously determined by the first empty register, taken from the input, which is followed by a full register (the register preceding the first full register), there never can be uncertainty as regards the input location for the data from the input bus to a register of the buffer. Instability is thus precluded. Moreover, a minimum delay time through the buffer is thus ensured. As a result of the use of the status condition for each section, being updated preferably in bistable elements as part of the logic, a simple arrangement is obtained which is suitable for integration purposes. As a result of the modular character of the construction, the relevant register and the associated logic can be constructed as a solid-state integrated circuit at least for each section of the data buffer memory. It is also possible for the buffer to consist of at least a group of registers and at least a group of logic circuits for each section of the buffer, said groups being solid-state integrated circuits. Said modular construction also implies that a plurality of buffer memories can be readily linked in order to obtain buffer lengths as desired.

Further particulars and characteristics of the buffer memory will become apparent from the following description of the embodiment.

The invention will now be described by way of example with reference to the accompanying drawings. The drawings show an example of an embodiment to which the invention, however, is by no means restricted.

DESCRIPTION OF THE PREFERRED EMBODIMENT

Figure 1:
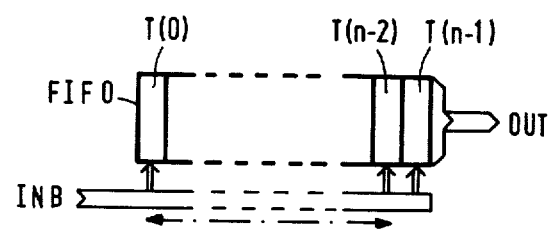
FIG. 1 shows a circuit diagram of a first-in, first-out buffer memory comprising a variable input and a fixed output.

FIG. 1 shows a simplified diagram of a first-in, first-out buffer memory comprising a variable input and a fixed output. The buffer is denoted by the reference FIFO. INB represents the input bus by which data can be supplied to the buffer, notably to an input of an assigned register of a section T(0), . . . T(n−2), T(n−1) thereof. This constitutes the variable input which is also denoted by a stroke-dot arrow in FIG. 1. The fixed output OUT is situated at the output of the register of the last section T(n−1) of the buffer memory.

Figure 2:
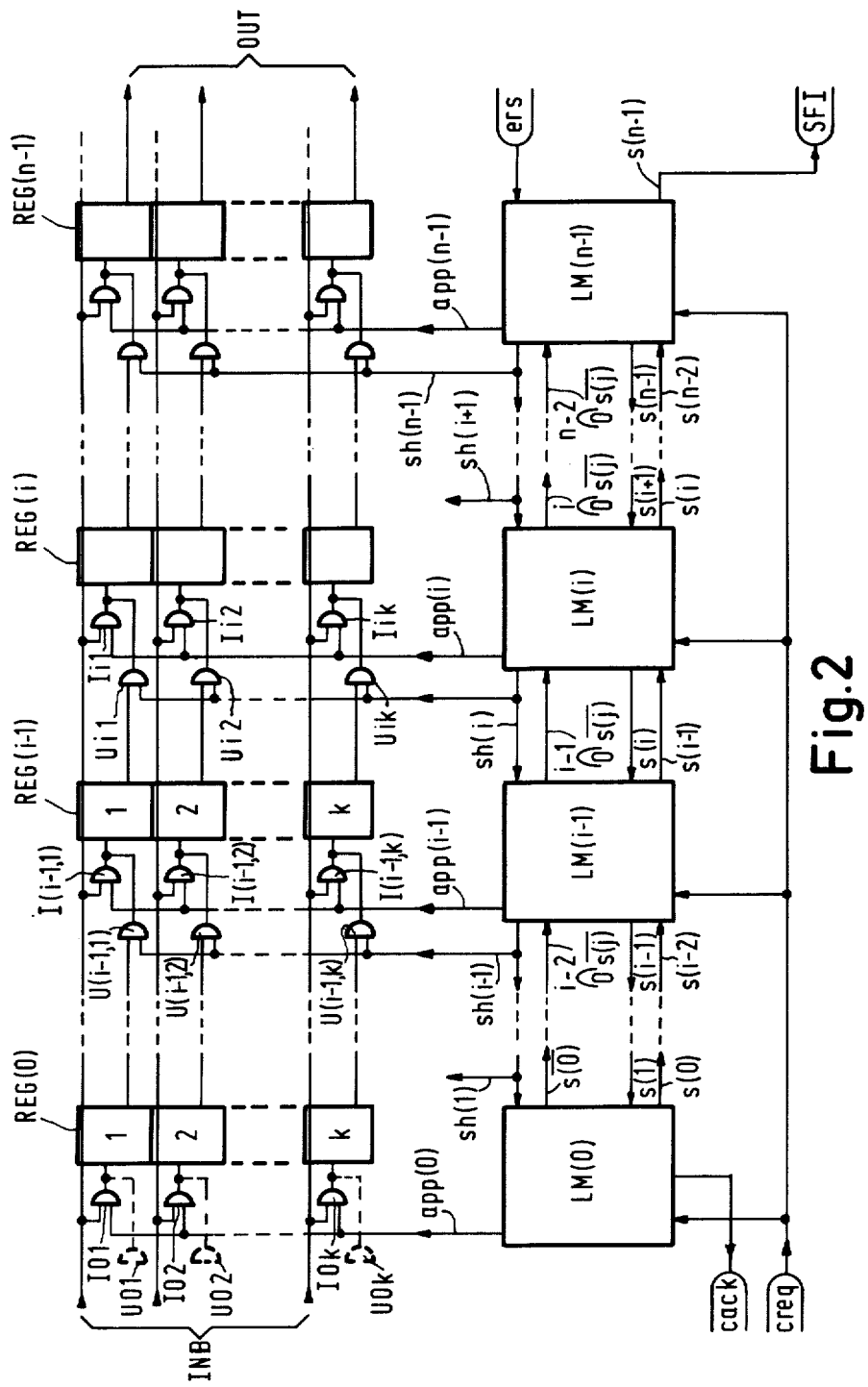
FIG. 2 shows a block diagram of an embodiment of a buffer memory in accordance with the invention.

FIG. 2 shows the block diagram of an embodiment of a buffer memory in accordance with the invention. This memory consists of a register section comprising the registers REG(0). . . REG(i−1), REG(i). . . REG(n−1). These registers serve for the storage of the applied data. Each register REG(i) may consist of one or more stages 1, 2, . . . k. This illustrates the possibility of selecting the data paths at random as far as the width is concerned: 1 bit data path requires one stage (1) per REG (i) etc. In FIG. 2 the input bus INB is shown to extend across the registers. Each register REG(i) has its inputs (of each stage 1, 2, . . . k) connected to the bus INB. AND-function gates are used for this purpose: IO1, IO2,. . . IOk for the relevant register stages 1, 2, . . k. of the register REG(O); . . . Ii1, Ii2, . . . Iik for the relevant register stages 1, 2, . . . k of the register REG(i) etc. The choice as to which one of the registers REG(i) is connected to the bus INB is determined by the logic circuit LM(O) . . . LM(i−1), LM(i), . . . LM(n−1) which are provided for each section of the buffer. A signal app(O), . . . app(i), . . . or app(n−1) is generated in said logic and is applied to said AND-function gates IO1, . . . IOk, . . . or Ii1,. . . Iik, . . . or I(n−1, 1), . . . I(n−1,k). Thus, the one register REG(i) of the buffer to which data are supplied from the bus INB is selected. The register REG(n−1) of the last section of the buffer constitutes the output OUT of the buffer. The contents of REG(n−1) are always available on the output OUT. The signal SFI generated in the buffer indicates whether or not valid information is present on the output OUT. When these data have been transferred to the surroundings (user), an acknowledge signal "ers" originating from outside the buffer serves to free the register REG(n−1) for storing the subsequent data. For shifting of the data between the sections in the buffer, connections are provided between the stages of the various registers, said connections extending across AND-function gates (U01, U02, . . . U0k) and Ui1, Ui2, . . . Uik, etc. between an output of a preceding register stage and an input of a next register stage. The gates U01, . . . U0k are denoted by broken lines, because these gates, connected to the first section, are not used. In the embodiment shown in FIG. 2, the inputs are shown to be combined for each stage of each register for the input from the bus INB as well as for the input for data shifted further from a preceding register stage. Shifting is effected under the control of the shift signals generated in the logic LM(i): sh(i). Finally, the assembly is controlled by a conditioned clock signal (not shown), that is, under the condition that app(i) or shi(i) is present.

Subsequently, the buffer memory consists of a control section comprising logic circuit LM(i) for each section of the buffer. The signals generated in these logic circuit are, in addition to the signals app(i) and sh(i): the status signals s(i) which constitute an indication with respect to the full ("1") or empty ("0") state of a register REG(i), or a combinatory form thereof:

$$\prod_{0}^{i} s(j),$$

which means that, on the basis of the Boolean AND-function of all registers REG(0) to REG(i), the status signal s(j) has a value zero (i.e. s(j)=1). This is the definition of the condition that all REG(0) . . . REG(i) preceding REG(i+1) are empty. The indication "empty" means that no valid information is present therein. Further particulars of the logic and the associated signals will be given with reference to FIGS. 5, 6 and 7. This is also applicable to the signals "cack", being an acknowledge signal which is output by the buffer in order to indicate that data supplied have been stored in a register REG(i), "creq", being a request from outside the buffer for storing data in the buffer, and "SFI" which indicates that data are present in at least one of the registers of the buffer, notably in the last register REG(n−1) for this type of buffer.

Figure 3:
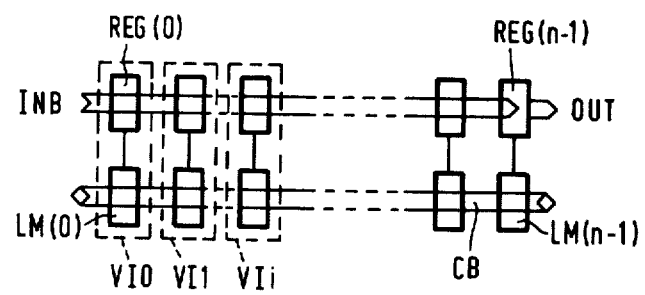
FIGS. 3 and 4 show examples of possibilities of partitioning the buffer memory in view of construction as solid state integrated circuits.
Figure 4:
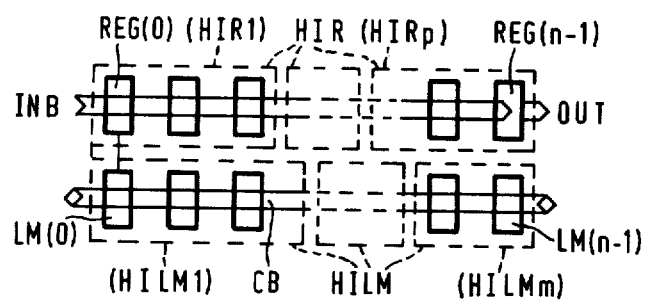

FIGS. 3 and 4 show a number of possibilities for partitioning the buffer memory in view of construction in the form of solid state integrated circuits. The modular character of the buffer memory shown in FIG. 2 enables a variety of solutions: the reference VIO, . . . VIi in FIG. 3 indicate that integration is possible at least for each section of the buffer: a register REG(O) is combined in an IC together with logic LM(O). The connection between all these sections VIi is formed in the register part by the input bus INB and the connections imagined within the bus INB in the drawing between the stages of the successive buffer sections in view of the shifting of the data from a preceding to a next section. The connections between the logic and the further input and output signals are shown in the form of a signal line bundle CB in FIG. 3.

FIG. 4 similarly shows that integration is possible in integrated circuits for each group HIR or groups HIR1, ... HIRp of register REG(O) ... REG(n−1), or for each group HILM or groups HILM1 ... HILMm of logic circuits LM(O), ... LM(n−1). Obviously, solid state construction of complete buffer memories in an IC is also possible. The linking of any chosen construction does not impose problems, as will be explained hereinafter with reference to the detailed embodiments of the logic for each section of the buffer.

Figure 5:
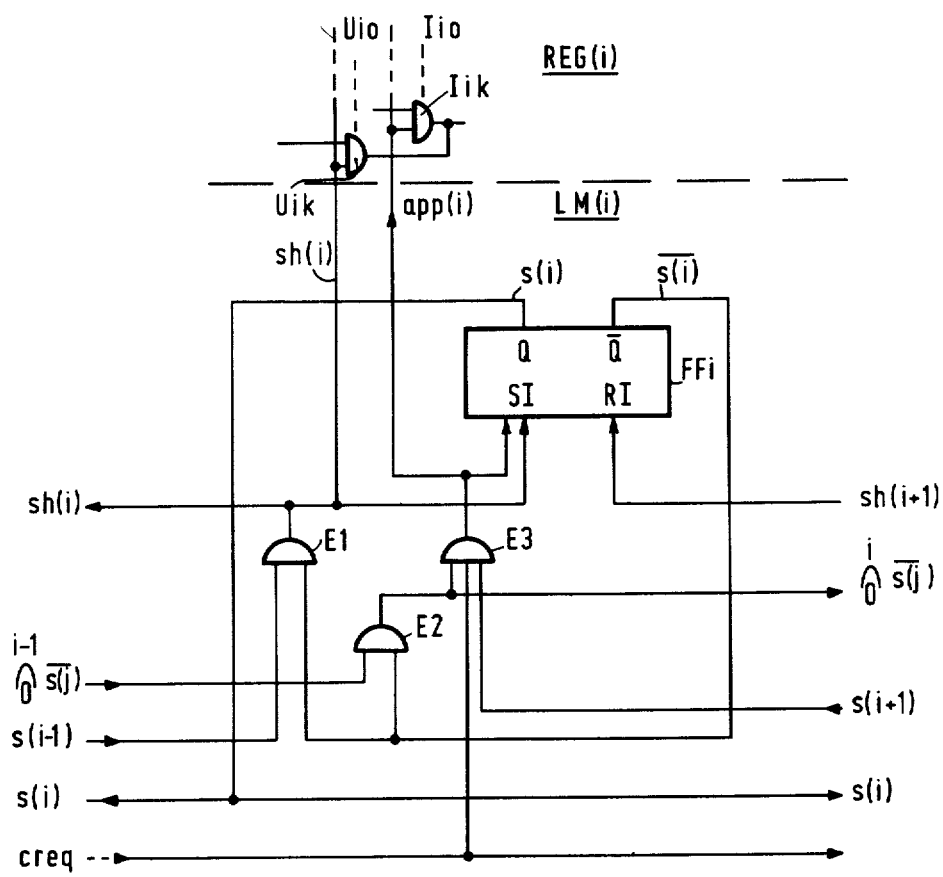
FIG. 5 shows an example of the logic circuit of a section (i) of the buffer memory.

FIG. 5 is a detailed description of an embodiment of the logic LM(i) of a buffer section (i) for the control of the register REG(i) of this section. In this embodiment, the logic includes a flipflop FFi having a set input SI and a reset input RI and outputs Q and $\bar{Q}$. This embodiment furthermore comprises three logic AND-function gates E1, E2 and E3. The logic circuits have a simple construction. In other embodiments, other logic elements such as NAND-gates etc. may be readily used. It is merely important that the logic functions to be performed by the logic can indeed be realized by these means.

The functions realized in the logic circuit LM(i) are such that the signals desired for the control of the buffer are generated. These signals are:

(a) app(i): the signal which provides the transfer of the data from the input bus, by said gates Ii1, ... Iik, to a register REG(i) of the buffer. This signal app(i)=1 (logic 1-value), provided that the condition creq.

$$\bigcap_{j=0}^{i} \overline{s(j)} \cdot s(i+1)$$

is "true" (which means that it has the logic value 1). In AND-function gate E3 it is determined whether this condition is satisfied. However, for this purpose it is first established in the gate E2 whether the expression $$\bigcap_{j=0}^{i} \overline{s(j)} = 1,$$

which means whether the condition that the register REG(i) and all preceding registers (this explains the symbol $\bigcap$ as the Boolean AND-function symbol) must be empty is satisfied. The validity of said expression creq.

$$\bigcap_{j=0}^{i} \overline{s(j)} \cdot s(i+1)$$

is tested in E3 on the basis of this information and the information whether the next register REG(i+1) is full, denoted by the status signal s(i+1) "true" (=1), and the request "creq" from outside the buffer.

(b) sh(i)=s(i−1)·$\overline{s(i)}$. This is the shift signal for shifting inside the buffer, notably when data have been taken up from the output of the buffer. The aim is to constantly ensure that the data are present in the buffer in a non-interrupted manner, viewed from the output. This is achieved by monitoring the condition s(i−1), $\overline{s(i)}$ by means of the AND-function gate E1. This condition is "true", so that the shift signal sh(i) appears, if the register REG(i) is empty (status $\overline{s(i)}$=1) and if the preceding register REG(i−1) is full (status s(i−1)=1).

(c) on the basis of said formation of said signals, the status signals of the sections of the buffer are also determined. Under the condition that app(i) or sh(i) is "true", which means =1, the register REG(i) is filled. The status then becomes s(i)=1 (logically written as s(i):=1':=meaning "becomes"). The signal app(i) or sh(i) sets the flipflop FFi to the position Q=1 which represents s(i)=1. When the register REG(1) is emptied, because the contents thereof are taken over, on the basis of the signal sh(i+1) by said gates Ui1, ... Uik, by the subsequent register REG(i+1) which is empty or which has become empty, sh(i+1) ensures that the flipflop FFi is reset, by its reset input RI, to the position Q=O, i.e. $\bar{Q}$=1. Thus, $\overline{s(i)}$=$\bar{Q}$=1, which means the status is s(i)=0.

In conjunction with the request signal "creq", the entire buffer is controlled by means of these three signals app(i) sh(i) and s(i) generated in the logic circuit LM(i).

As appears from FIG. 5, the logic means LM(i) comprise a number of inputs, that is for the signals s(i−1), $$\bigcap_{o}^{i-1} s(j) \; (\bigcap_{o}^{i-1} \text{being} \bigcap_{j=o}^{i=1})$$

and the request signal "creq" or the signals (i+1) and sh(i+1). The outputs of LM(i) serve for the signals sh(i), s(i) or $$\bigcap_{o}^{i} \overline{s(j)}$$

and s(i) and, if so desired, also for "creq" which is connected by the LM(i).

These inputs and outputs are identical for all logic circuit, including LM(O) and LM(n−1), which means that the contents of these logic circuit are always the same. Hepetitivity in the buffer memory is thus ensured.

Figure 6:
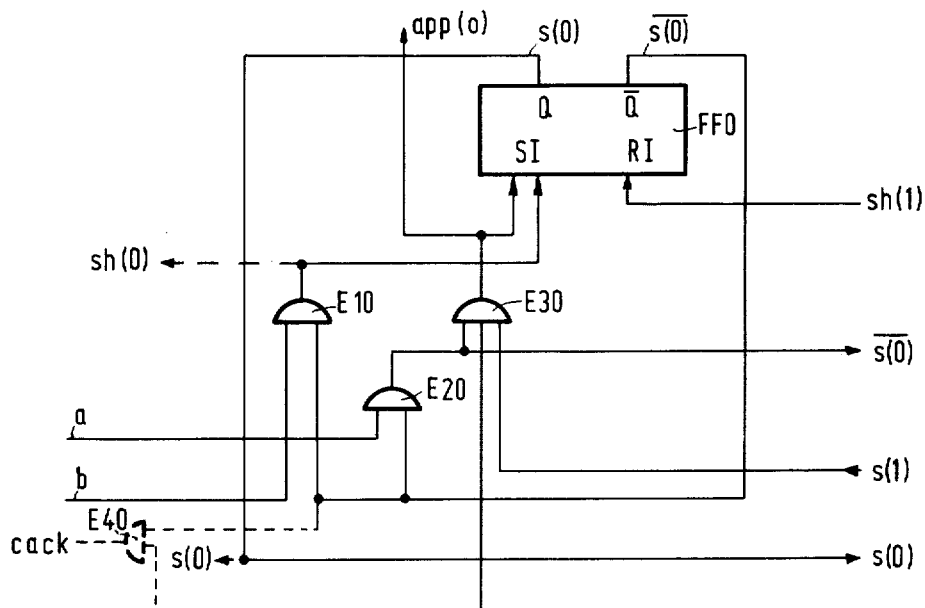
FIG. 6 shows an example of the logic circuit of a section (O) of the buffer memory.

In order to illustrate this aspect, FIG. 6 shows a detailed diagram of the logic circuit LM(O) which constitute the first section of the buffer in conjunction with the register REG(O). The diagram is substantially identical to FIG. 5 because E10 performs the same function as E1 in FIG. 5, E20 the same as E2 and E30 the same as E3 in FIG. 5. The only difference consists in the situation of the signals on the lefthand side of the LM(O) in FIG. 6. Because there are no further preceding sections, no signal $$\bigcap_{o}^{i-1} \overline{s(j)}$$

(on line a) and no signal s(i−1) (on line b) is possible. In order to enable the control to be performed after all, a signal having the logic value "1" is applied to input a (all "preceding" empty $$\sum_{o}^{i-1} s(j) = 1)$$

and a signal having the logic value "0" is applied to input b (preceding is empty $s(i-1)=O$). The signals $s(i)=s(O)$ and $sh(i)=sh(O)$, output from this side to preceding sections, are not further used, unless sections are arranged in front of this first section upon extension of the buffer. In that case, the inputs a and b are normally used again. Therefore, extension of the buffer on this side is not problematic.

Figure 7:
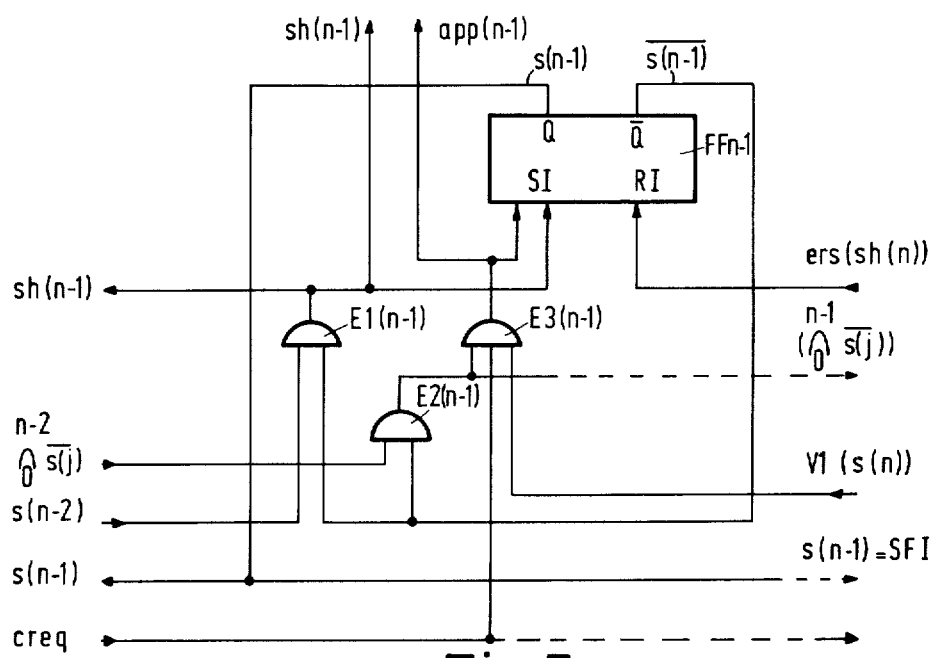
FIG. 7 shows an example of the logic circuit of a section (n−1) of the buffer memory.

FIG. 7 illustrates that the coupling of a buffer on the other side, that is, the rear of a buffer to be arranged in front thereof, is not problematic either. According to the solution shown in FIG. 6, if desired (as in many data processing system applications), it is possible for the buffer to provide an acknowledge signal "cack" in order to indicate that applied data have been stored in a register thereof. When the buffer is completely filled, "creq" will not be honored, so "cack" will not be generated. This is signalled if REG(O) is full, so when $s(O):=1$. "Cack" can be simply generated in the logic LM(O) by means of an AND function gate E40 whereby it is determined whether the condition s(O). creq has been satisfied. This is because in the case of a request signal creq=1 new data can still be stored as long as the register REG(O) remains empty (which means $\overline{s(O)}=1$). On the basis of cack=creq.$\overline{s(O)}$, stored in a flipflop (not shown), acknowledgment is thus always given outside the buffer in order to signify that data have been received. When the buffer is completely filled, no further data can be received and cack does not occur (the relevant flipflop is reset), so that it is externally known (for example, by the data processing system) that no newly applied data have been received by the buffer.

Similar to the foregoing, FIG. 7 shows a detailed diagram of the logic circuit $LM(n-1)$ which constitute, in conjunction with the register $REG(n-1)$, the last section of the buffer. The diagram is again substantially identical to FIG. 5 because $E1(n-1)$ represents E1, $E2(n-1)$ represents E2 and $E3(n-1)$ represents E3. The signals at the left-hand side of the FIG. 7 fully correspond to those at the left-hand side of FIG. 5. The only difference consists in the situation of the signals at the right-hand side of $LM(n-1)$ in FIG. 7. Because there are no subsequent sections, a signal $s(i+1)=s(n)$ is not possible. In order to enable control to be performed, again a signal $V1=1$ (logic 1-value) is applied to this input. Moreover, obviously no shift signal sh(n) appears. However, because $REG(n-1)$ constitutes the output of the buffer itself, the signal "ers" is present, representing an acknowledge signal from outside the buffer, to indicate that data have been read from the buffer (that is, from REG/n−1). Therefore, for $LM(n-1)$ "ers" has an effect as if a shift has taken place, so that it may be stated: ers=sh(n). Output signals $$\sum_{o}^{n-1} s(j)$$

and $s(n-1)$ (and "creq") are not further utilized. However, if extension of the buffer is necessary or if the buffer is arranged in front of an other buffer, said signals can be normally used again and extension of the buffer is possible without any complications. An additional advantage is that the signal $s(n-1)$ can be used as a signal SFI for outside the buffer to signal that at least one section has been filled. In view of said shifting mechanism, this section will always be the last section, so that if $s(n-1)=1$, this status is decisive for the information (SFI). This implies that data are present on the OUT lines.

With respect to the simple extension possibilities of the buffer, it is to be noted that this extension does not necessarily mean, notably in the case of use of solid state integrated buffers, that all signal lines must be continued (to a next or preceding buffer). It is sufficient to connect a "creq" signal input to an SFI signal output and to connect a signal input "ers" to a signal output "cack" of two identical buffers to be coupled to each other. However, in that case, the delay time increases. For each added additional buffer, the delay time increases by one unit (the minimum delay time through a buffer then represents one unit). Using this solution it is prevented, however, that a buffer IC must be provided with an excessive number of input/output terminals.

As a result of the described logic circuit, a buffer memory of the first-in, first-out type is obtained which comprises a variable input and a fixed output and which always has a minimum delay time for newly supplied data; this is because new data are always received in the buffer as near to the output of the buffer as possible. The described function of the app(i) signal ensures that a first empty register (which therefore has only empty registers ahead of itself) prior to a first full register (i+1) is filled. Uncertainty as regards the location of storage of the data from the input bus in a register (i) is not possible: there is always only one location for which $app(i)=1$ is valid. Furthermore, the signal sh(i) always ensures that "holes" arise in the buffer only temporarily, which means that empty sections between filled sections are always filled. This implies that, if somewhere a status $s(i)=1$ changes into $s(i)=O$ as a result of a fault, such a "hole" is filled immediately. The data present in the relevant register (i) are then lost (erased by the shifted data), but no uncertain condition arises. If a status $s(i)=O$ becomes $s(i=1)$ somewhere as a result of a fault, this situation is shifted against the first full section in the buffer again by the shifting mechanism and is subsequently shifted to the output (in reaction to signals "ers") in the normal manner. A section containing invalid information has thus been created, but this information disappears towards the output and does not cause permanent uncertainty in the buffer. It is thus unambiguously achieved that the buffer is self-stabilizing. This is an important property which is required for many applications in the field of data processing and communication technique. Finally, it is to be noted that in view of the practical construction of the buffer, use is made of, for example, edge-controlled flipflops (for example, Signetic type 74LS74), described on page 84, Signetics Integrated Circuits, Philips Data Handbook, published at Sunnyvale, Calif., 1976 because of the fact that the status flipflops FFi must be able to read themselves. It is alternatively possible to utilize so-termed master/slave flipflops. In that case use must be made of at least two clock pulse signals (instead of one clock pulse signal in the above case). However, the principles of the invention are by no means modified thereby and realisation is readily possible by those skilled in the art.

What is claimed is:

1. A data buffer memory of the first-in, first-out type, having logic means for ensuring that an input for data to be written is situated substantially as near as possible to an output for data to be read depending on the filling of the buffer, thus providing an uninterrupted content of the buffer, said buffer having a plurality of registers, each register having at least one section, furthermore having an input bus for supplying data to an input of a register of said buffer assigned for this purpose, and an output connected to the last register of the buffer on which data to be read appear, said data buffer comprising:

logic means provided for each section of said buffer;

said logic means being at least functionally separate from said sections of said buffer except for connections;

said logic means being of the type enabling signals to be generated for a buffer having n registers (O, ... n−1):

first logic means for detecting a condition that a register (i) is empty and that the next register (i+1) is full, plus determining where from the series of empty registers, the empty register adjoins a subsequent filled register;

second logic means for generating a shift signal for shifting the data in said buffer in the direction of the output register, indicating the status full of a preceding register and indicating the status empty of the relevant register (i);

third logic means for generating a status signal for the filling of a register (i) as the result of data entering said register;

said third logic means also serving to generate a status signal for the last register in said buffer when data is read from said last register.

2. A data buffer memory as claimed in claim 1 further comprising:

fourth logic means for generating an acknowledge signal outputed by said buffer to indicate that data supplied to said buffer has been stored in a register (i) of said buffer.

3. A data buffer memory as claimed in claim 2 further comprising:

further logic means for generating a signal indicating that a least the first register of said buffer is empty and is able to receive new data.

4. A data buffer memory as claimed in claim 1 further comprising:

logic means for generating a status signal on an output of said buffer indicating that data are present in at least the last register of said buffer.

5. A data buffer memory as claimed in claim 1 wherein said memory is constructed from solid state integrated circuits.

6. A data buffer memory as claimed in claim 5 wherein for each section of said buffer a register and associated logic means form a solid state integrated circuit.

7. A data buffer memory as claimed in claim 5 wherein said buffer consists of at least one group of registers and at least one group of logic means for each section of said buffer, said groups being solid state integrated circuits.

* * * * *